United States Patent
Zeng et al.

(10) Patent No.: US 7,612,915 B2
(45) Date of Patent: Nov. 3, 2009

(54) DETERMINING COMPOSITE GRAYS

(75) Inventors: Huanzhao Zeng, Vancouver, WA (US); Mary Nielsen, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 11/254,628

(22) Filed: Oct. 20, 2005

(65) Prior Publication Data

US 2007/0091374 A1    Apr. 26, 2007

(51) Int. Cl.
H04N 1/40    (2006.01)
(52) U.S. Cl. .............. 358/3.02; 358/3.01; 358/3.03; 358/3.06; 358/534; 345/63; 345/77; 345/89; 345/589
(58) Field of Classification Search ........... 358/3.01, 358/3.02, 1.9, 518, 519, 501
See application file for complete search history.

(56) References Cited

U.S. PATENT DOCUMENTS

| | | | |
|---|---|---|---|
| 5,072,305 A * | 12/1991 | Numakura et al. ........ 358/3.01 |
| 5,966,507 A * | 10/1999 | Lin ........................... 358/1.9 |
| 6,141,120 A * | 10/2000 | Falk ........................ 358/504 |
| 6,421,142 B1 | 7/2002 | Lin et al. |
| 6,462,836 B1 * | 10/2002 | Sato et al. ................ 358/3.01 |
| 6,765,586 B2 | 7/2004 | Yamazaki et al. |
| 6,851,794 B2 * | 2/2005 | Yamamoto ................ 347/43 |
| 6,876,467 B1 * | 4/2005 | Yamaguchi .............. 358/1.9 |
| 6,890,049 B2 * | 5/2005 | Shimada et al. ........... 347/15 |
| 7,277,200 B2 * | 10/2007 | Ohga ....................... 358/1.9 |
| 7,365,890 B2 * | 4/2008 | Saito et al. ............... 358/523 |
| 7,573,613 B2 * | 8/2009 | Takemoto et al. ........ 358/3.01 |
| 2003/0049040 A1 * | 3/2003 | Tezuka et al. ............. 399/49 |
| 2004/0227977 A1 * | 11/2004 | Yoshida .................... 358/3.01 |
| 2005/0200868 A1 * | 9/2005 | Yoshida .................... 358/1.9 |

* cited by examiner

*Primary Examiner*—King Y Poon
*Assistant Examiner*—Dung D Tran (57) ABSTRACT

A system and method for determining composite grays using device values. Device values are received from image data on which color separation was performed. Gray component replacement are determined on black point device values by using target lightness values, target chromaticity values, and target black device values. A printing device and a computer readable media having computer instructions for implementing the method of determining composite grays are also provided.

19 Claims, 6 Drawing Sheets

DETERMINING COMPOSITE GRAYS

In the field of color science, composite gray colors can be produced with black and non-black colors by using various methods. Composite gray colors can be determined by performing gray component replacement, by manually determining grays, or by using balanced one-dimensional look-up-tables. However, each of these methods can result in composite grays that are unbalanced and/or inaccurate and that may require neutral recalibration.

DETAILED DESCRIPTION

Embodiments of the present disclosure include methods, computer readable media, computing devices, and application-specific integrated circuits (ASICs) that include program instructions that are executable to determine composite grays. One method embodiment includes defining target lightness values by performing a black point adjustment on lightness values of black device values. This method includes defining target chromaticity values corresponding with a chromaticity curve of neutral grays. This method also includes defining target black device values by performing gray component replacement on black device values. This method further includes determining composite gray device values by using the target lightness values, the target chromaticity values, and the target black device values.

Figure 1:
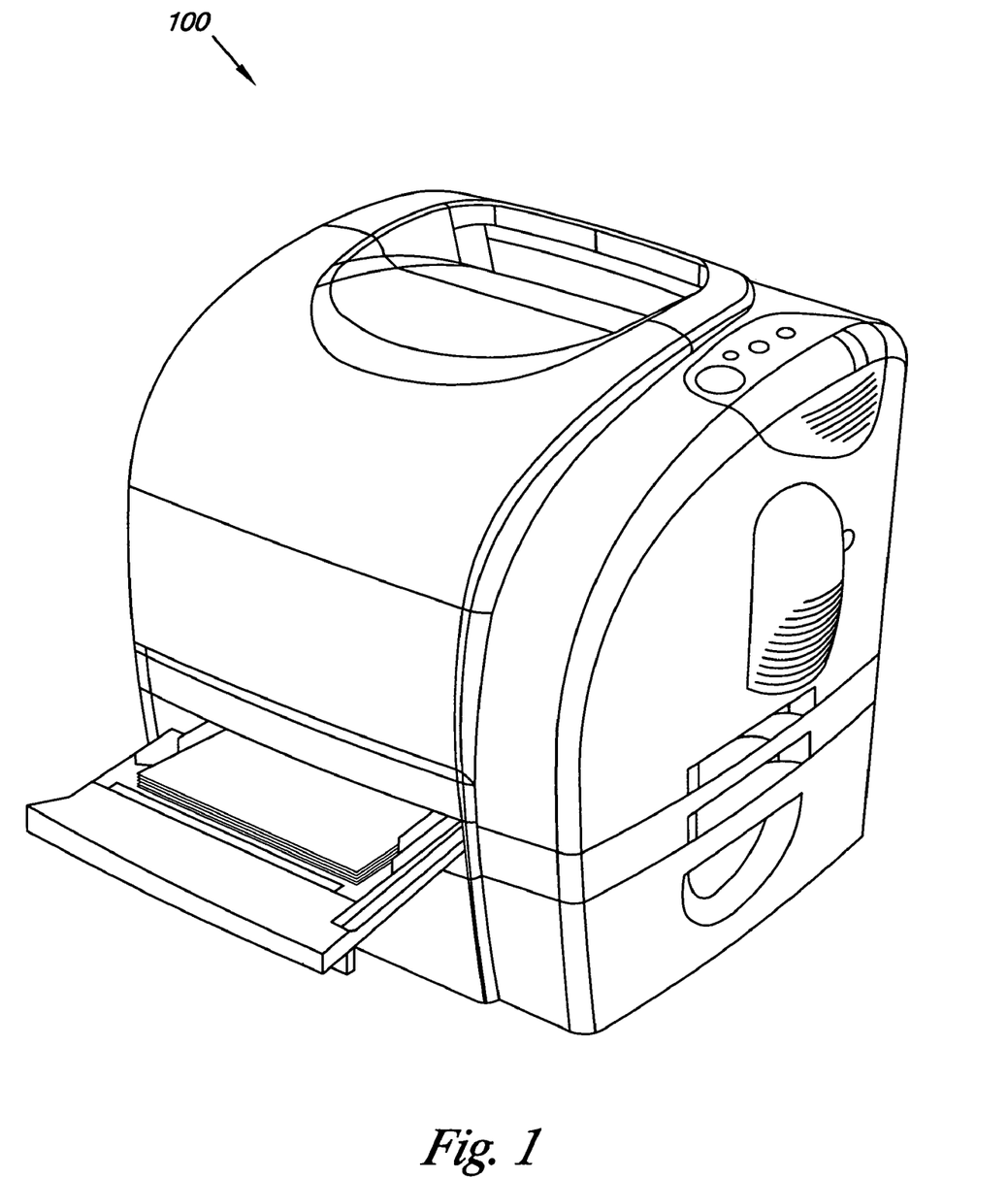
FIG. 1 illustrates an example of an output device suitable to produce a color image, according to embodiments of the present disclosure.

FIG. 1 illustrates an example of an output device suitable to produce a color image, according to an exemplary embodiment of the present disclosure. FIG. 1 illustrates a printing device 100, which can use device values to print color images, including color characters, on media, such as paper or transparent film. The printing device 100 can use device values, obtained from image data on which device color separation has been performed. Other examples of output devices include color copiers, color multi-function-peripherals, and color multi-functional printers.

Printing devices can use various printing techniques. Printing devices can print on media by using techniques such as firing ink jets and/or by using toner and a laser. Various embodiments of printers, including ink jet and laser printers, can print color images, including color characters.

Printing devices can also use various device colors in printing. Printing devices can use three, four, six, or another number of device colors in various combinations in printing. Printing devices can use device colors, such as cyan (C), magenta (M), yellow (Y), and black (K). As one example, a printing device can print using non-black device colors, such as CMY, in which non-black device colors can be combined in an attempt to produce black and shades of gray in a printed color image. As another example, a printing device can print using composite gray device colors, such as CMYK, in which black and non-black device colors can be used in various combinations.

An output device can produce a target, from which colors can be measured. For example, a CMYK inkjet printer can print a CMYK target. In various embodiments, a target can be produced for color mapping or for generating a profile of an output device, such as a printer ICC profile. A color measuring device, such as a spectrophotometer, can be used to measure colors in a target.

In one embodiment of the present disclosure, program instructions can execute to use color measurements from a target to establish a relationship between device values and color exchange space values. For example, program instructions can execute to use color measurements from a CMYK target printed by an inkjet printer to establish a relationship between device values of the printer and CIELAB values. In one embodiment of the present disclosure, program instructions can execute to use this relationship between device values and color exchange space values to generate a look-up-table (LUT). For example, program instructions can execute to use a relationship between device values of a CMYK printer and CIELAB values to generate a CMYK2LAB LUT.

Device values for a black point of an output device can also be calculated. For example, program instructions can execute to calculate device values of a CMYK inkjet printer for a black point of the printer by using the following formulas:

$$K = Kmax$$

$$C = M = Y = (CMYKtot - Kmax)/3$$

where K is a black device value at the black point, Kmax is an upper black device value for the printer, C, M, and Y, are cyan, magenta, and yellow device values at the black point, and CMYKtot represents a total ink coverage for the printer. In various embodiments of the present disclosure, program instructions can also execute to apply additional constraints to the calculation of device values for a black point. For example, when calculating device values for a black point of a CMYK printer, program instructions can execute to apply preference settings to specify characteristics of grays, such as appearing warmer or cooler or having better neutral balance. In various embodiments, different output devices can have different device values for their black points.

Color exchange space values for a black point of an output device can be defined from device values for the black point. In one embodiment of the present disclosure, program instructions can execute to use a relationship between device values and color exchange space values to define color exchange space values for a black point of an output device from device values for the black point. For example, program instructions can execute to use a CMYK2LAB LUT to define color exchange space values, such as CIELAB values, for a black point of an inkjet printer from CMYK device values for the black point. In one embodiment of the present disclosure, this LUT can be generated using a relationship based on colors measured from a target of an output device, as described above.

Figure 2:
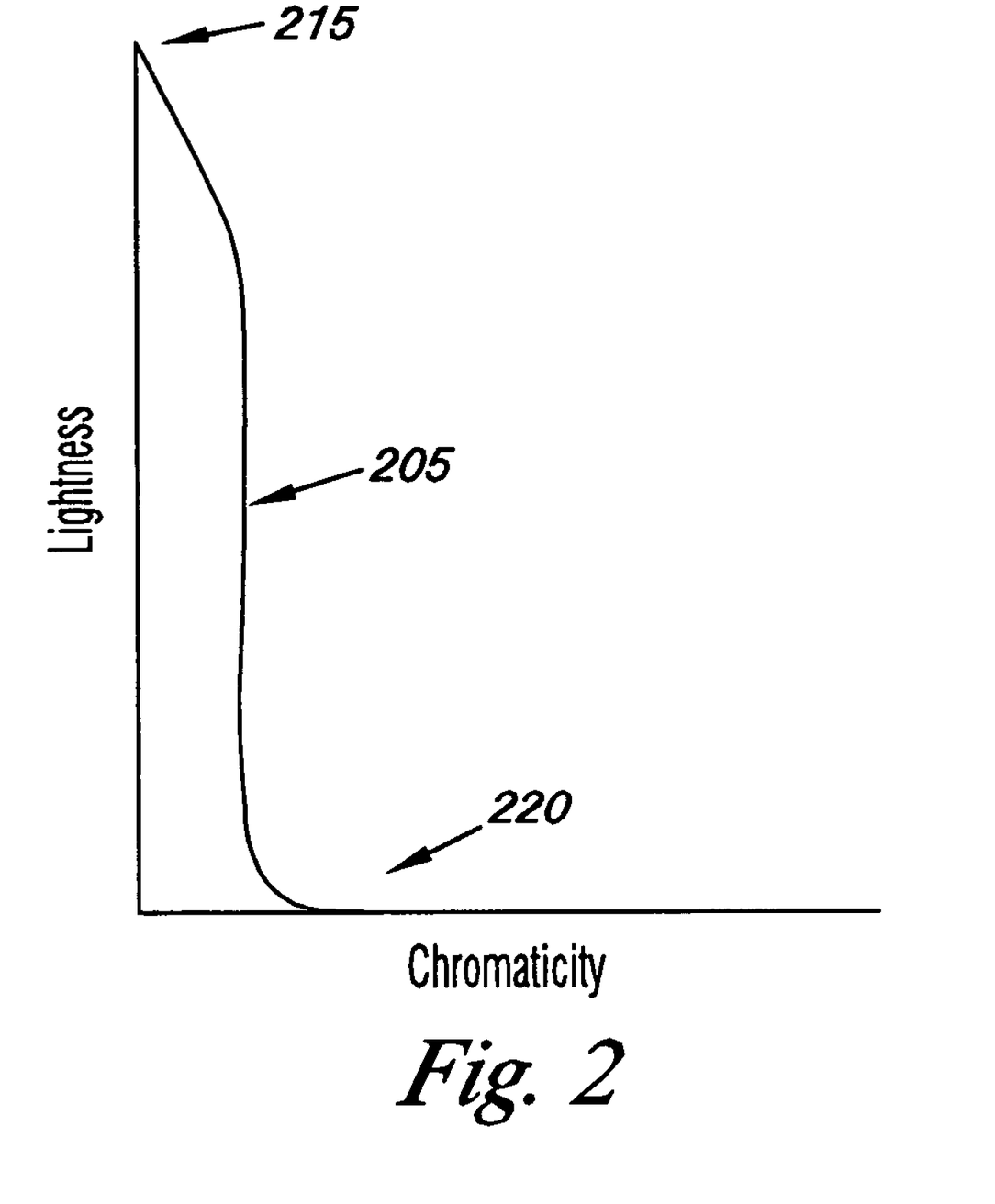
FIG. 2 illustrates an example chromaticity graph showing a chromaticity curve of neutral grays, according to embodiments of the present disclosure.

FIG. 2 illustrates an example chromaticity graph showing a chromaticity curve of neutral grays, according to embodiments of the present disclosure. In FIG. 2, the chromaticity curve 205 can be plotted in terms of lightness and chromaticity using color exchange space values. FIG. 2 is a simplified illustration of a chromaticity graph, showing a horizontal axis, such as an a* axis or a b* axis in CIELAB, with positive values. In various embodiments, a chromaticity graph can have a horizontal axis with both positive and negative values. Chromaticity values in the graph FIG. 2 are provided relative to a media white.

The chromaticity curve 205 includes a white point 215 and a black point 220. As shown in FIG. 2, there is zero chromaticity at the white point 215. However, there is some chromaticity at the black point 220. In the embodiment of FIG. 2, the black point 220 has the highest chromaticity of the chromaticity curve. In one embodiment of the present disclosure, the black point 220 can be a black point with device values calculated using formulas and converted into color exchange space using a LUT, as described above. The chromaticity curve 205 smoothly transitions from the white point 215 to the black point 220. The chromaticity curve 205 shown in FIG. 2 is intended to be illustrative and is not intended to limit a chromaticity curve of the present disclosure to any particular size or shape.

In one embodiment of the present disclosure, the chromaticity graph of FIG. 2 can be used as a LUT. Program instructions can execute to define target chromaticity values by using the chromaticity graph of FIG. 2 to look up chromaticity values for a corresponding lightness values. Program instructions can also execute to define a set of N target chromaticity values, where N is a particular number that corresponds with a dimension of a color separation LUT. For example, program instructions can execute to use the chromaticity curve 205 as a LUT, to define a set of 17 chromaticity values that corresponds with a 17×17×17 color separation LUT.

Figure 3:
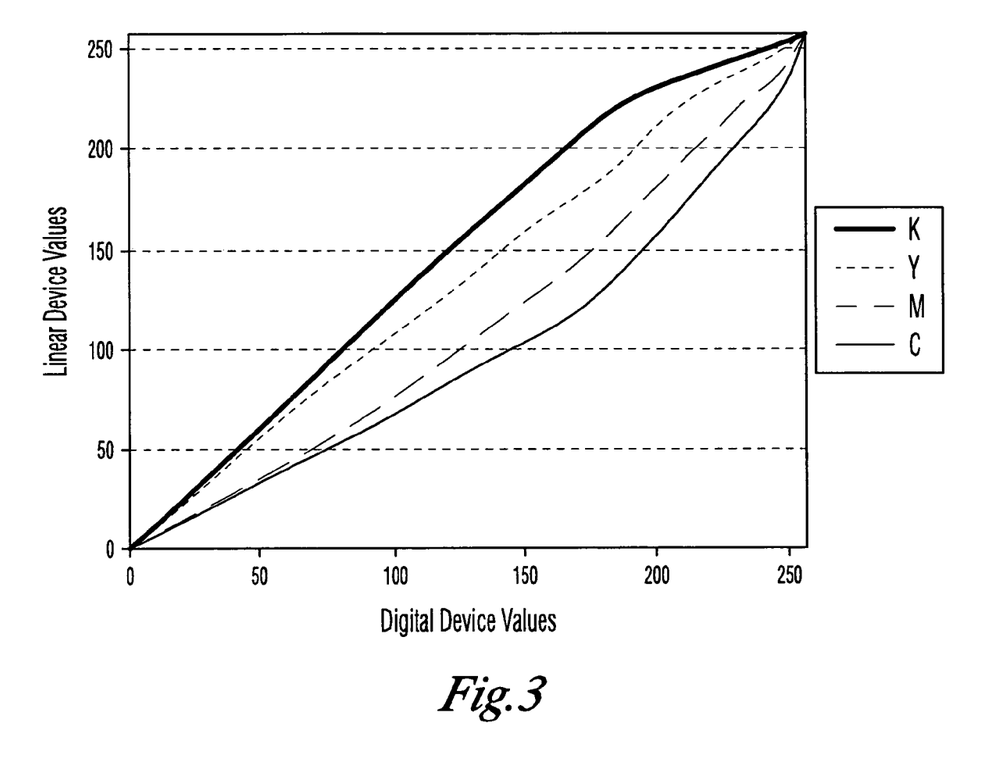
FIG. 3 illustrates an example digital to linear look-up-table, according to embodiments of the present disclosure.

FIG. 3 illustrates an example digital to linear look-up-table, according to embodiments of the present disclosure. The digital to linear LUT of FIG. 3 illustrates relationships between digital device values and linearized device values for C, M, Y, and K colors of an output device. However, in various embodiments a digital to linear LUT can illustrate digital to linear relationships for one of or more of these colors and/or one or more other colors. The LUT of FIG. 3 shows individual device value curves for C, M, Y, and K as shown by a legend to the right of the LUT. The device value curves shown in FIG. 3 are intended to be illustrative and are not intended to limit a device value curve of the present disclosure to any particular size or shape.

In the LUT of FIG. 3, the device values range from a lower value of zero to an upper value of 255, as shown for both the digital device values and the linearized device values. At a lower device value, an output device associated with the lower device value can produce a least amount of a particular color. For example, at a lower device value of zero for C, a CMYK inkjet printer can produce no cyan. At an upper device value, an output device associated with the upper device value can produce a greatest amount of a particular color. As an example, at an upper device value of 255 for K, a CMYK inkjet printer can produce its greatest amount of black. The LUT of FIG. 3 includes a media white point, at which C=M=Y=K=0 and an upper value at which C=M=Y=K=255. In various embodiments, device value ranges can have various upper values.

In one embodiment of the present disclosure, program instructions can execute to use a digital to linear LUT to look up linearized device values that correspond with digital device values for a particular color. For example, program instructions can execute to use the LUT of FIG. 3 to look up a linearized device value for C that corresponds with a digital device value of 150. In this example, program instructions can execute to determine that for cyan, a digital device value of 150 can equal a linearized device value of approximately 100. Program instructions can also execute to use a digital to linear LUT to convert a digital device value into a linearized device value (e.g. linearizing the device value).

Similarly, program instructions can also execute to use a linear to digital LUT to convert a linearized device value into a digital device value (e.g. digitizing the device value). A linear to digital LUT can also illustrate relationships between linearized device values and digital device values for one or more colors. In one embodiment, a linear to digital LUT can be an inverse of a digital to linear LUT. When one LUT is an inverse of another LUT, the LUTs can describe the same relationship in different ways.

In one embodiment, program instructions can execute to use a digital to linear LUT to look up digital device values that correspond with linearized device values for a particular color. For example, program instructions can execute to use the LUT of FIG. 3 to look up a digital device value for C that corresponds with a linearized device value of 100. In this example, program instructions can execute to determine that for cyan, a linearized device value of 100 can equal a digital device value of approximately 150. In a similar embodiment, program instructions can execute to use a linear to digital LUT to look up linearized device values that correspond with digital device values for a particular color.

A digital to linear LUT can be generated in various ways. In one embodiment, program instructions can execute to generate a digital to linear LUT for C, M, Y, and K by using a gray balance technique. In a gray balance technique device value curves can be generated for black and one non-black color of an output device, then, device value curves can be generated for the other non-black colors of the output device, so that a combination of the non-black colors produces gray colors. For example, device value curves can be generated for K and C, and then device value curves can be generated for M and Y so that combinations of C, M, and Y can be used to produce gray colors. In some embodiments, program instructions can execute to generate a linear to digital LUT from a digital to linear LUT. For example, a digital to linear LUT can be used to generate an inverse linear to digital LUT. A linear to digital LUT can be generated in similar ways, as will be understood by one of ordinary skill in the art.

In one embodiment of the present disclosure, a set of linearized black device values for an output device can be defined by sampling. Program instructions can execute to define a set of linearized black device values by uniformly sampling black device values for an output device from a media white point, at which a device value for each color of the output device can equal zero, to a process black point, at which a device value for each non-black color can equal a lower device value for the output device and a device value for a black color can equal an upper device value for the output device. Program instructions can execute to define a set of linearized black device values by uniformly sampling black device values in a digital to linear LUT or a linear to digital LUT, such as those described above. Program instructions can also execute to define a set of N linearized black device values, where N is a particular number that corresponds with a dimension of a color separation LUT. For example, program instructions can execute to uniformly sample black device values for a CMYK inkjet printer at its media white point, at which C=M=Y=K=0, then at device values of 15, 31, 47, and so on, continuing at intervals of 16, up to its process black point, at which C=M=Y=0 and K=255, to define a set of 17 linearized black device values that corresponds with a 17×17×17 color separation LUT.

A set of linearized black device values, such as the sets described above, can be used in various embodiments of the present disclosure, as part of determining composite grays. In one embodiment, a gray component reduction can be performed on a set of linearized black device values, as described in connection with FIG. 4. In one embodiment, a set of linearized black device values can be converted into digital device values, for further use in determining composite grays. Program instructions can execute to use a linear to digital LUT, such as the LUTs described above, to convert a set of linearized black device values, such as a uniformly sampled set described above, into a set of digital black device values. A lightness value can be calculated for each digital black device value in a set of digital black device values, by using a LUT that relates device values to color exchange space values. For example, program instructions can execute to calculate L* values for each digital black device value in a set of 17 digital black device values, converted from a set of uniformly sampled linearized black device values, by using a CMYK2LAB LUT, such as the LUT described in connection with FIG. 1.

Figure 4:
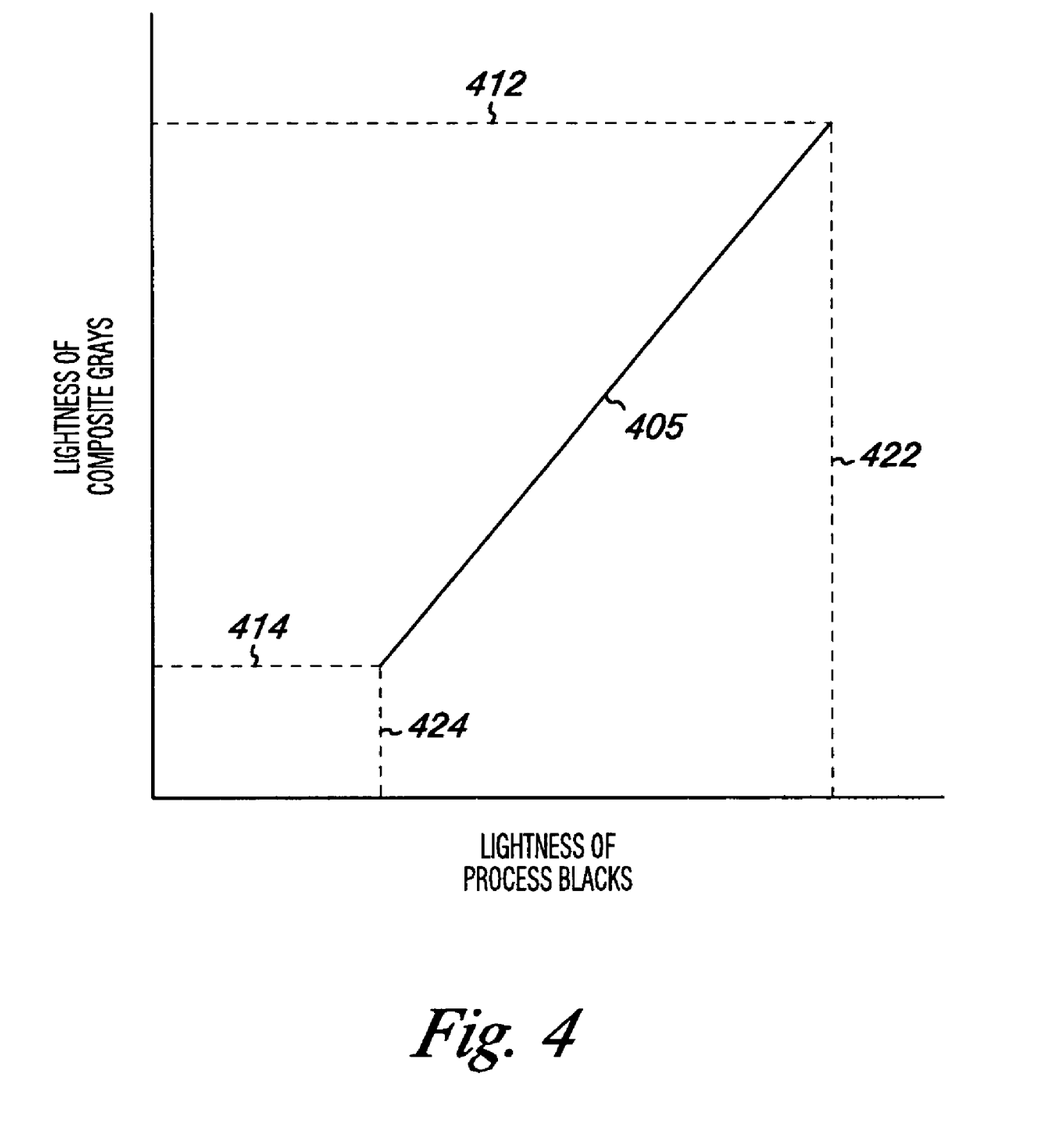
FIG. 4 illustrates a graph of a lightness mapping curve, according to embodiments of the present disclosure.

FIG. 4 illustrates a graph of a lightness mapping curve, according to embodiments of the present disclosure. The graph of FIG. 4 illustrates a relationship for an output device in a color exchange space between lightness of composite grays on the vertical axis and lightness of process blacks on the horizontal axis. The vertical axis includes an upper composite gray lightness value 412, which can represent a lightness of a media white point, at which each color can equal zero, and a lower composite gray lightness value 414, which can represent a lightness of a black point of the output device In one embodiment of the present disclosure, the lower composite gray lightness value can be a lightness of a black point calculated using formulas and converted into color exchange space using a LUT, as described in connection with FIG. 2.

Similarly, the horizontal axis includes an upper process black lightness value 422, which can represent a lightness of a media white point, and a lower process black lightness value 424, which can represent a lightness of a process black point of the output device, at which black can equal an upper device value. The graph of FIG. 4 also includes a lightness curve 405, which can represent target lightness values for composite grays, between the upper and lower values. In one embodiment of the present disclosure, program instructions can execute to define target lightness values for a set of composite grays by defining the lightness curve 405. The lightness curve 405 shown in FIG. 4 is intended to be illustrative and is not intended to limit a lightness curve of the present disclosure to any particular size or shape.

Program instructions can execute to calculate upper and lower lightness values for a lightness mapping curve. In one embodiment of the present disclosure, program instructions can execute to adjust device values for non-black colors, so that the combination of black and non-black colors achieves a better neutral balance, as will be understood by one of ordinary skill in the art. Program instructions can also execute to define the lightness curve 405. In one embodiment of the present disclosure, program instructions can define the lightness curve 405 by using the following black point adjustment formula:

$$Lcrv=Lcbp+(Linp-Lpbp)*(Lwp-Lcbp)/(Lwp-Lpbp)$$

where Lcrv is a resulting lightness value with an adjusted black point and can be a value on the lightness curve 405, Lcbp is a lightness of a composite gray black point for an output device, Linp is an input lightness value with a black point to be adjusted, Lpbp is a lightness of a process black point for the output device, and Lwp is a lightness of a media white point. In some embodiments of the present disclosure, this black point adjustment formula can use lightness values in color exchange space, such as L* values in CIELAB.

In one embodiment of the present disclosure, program instructions can execute to use the black adjustment formula for input lightness values from digitized uniformly sampled black device values with lightness values calculated by using a LUT that relates device values to color exchange space values, as described in connection with FIGS. 2 and 3. Program instructions can also execute to define a set of N target lightness values, where N is a particular number that corresponds with a dimension of a color separation LUT. For example, program instructions can execute to use the black point adjustment formula on a set of 17 digital black device values to define a set of 17 lightness values that corresponds with a 17×17×17 color separation LUT.

A composite gray replacement can be performed on linearized black device values by using a gray component replacement formula. For example, program instructions can execute to use the following gray component replacement formula to perform gray component replacement on a linearized black device value:

$$Kgcr=Kmax*((Kinp-Kstr)/(255-Kstr))^{EF}$$

where Kgcr is a resulting linearized black device value with a replaced gray component, Kmax is an upper black device value for an output device, used as a weighting factor, Kinp is an input linearized black device value with a gray component to be replaced, Kstr is a starting value for gray component replacement, 255 is an upper device value for the output device, and EF is an exponential factor between zero and one used as a shaping factor. The value 255 in the above gray component replacement formula can be different for different output devices. This gray component replacement formula can be used for linearized black device values.

The gray component replacement formula can be used to define linearized black device values with replaced gray components, which can represent target black device values for composite grays. In one embodiment of the present disclosure, program instructions can execute to use the gray component replacement formula for input linearized black device values that are uniformly sampled linearized black device values, as described in connection with FIG. 3. Program instructions can also execute to define a set of N resulting linearized black device values with replaced gray components, where N is a particular number that corresponds with a dimension of a color separation LUT. For example, program instructions can execute to use the gray component replacement formula on a set of 17 uniformly sampled linearized black device values to define a set of 17 linearized black device values with replaced gray components that corresponds with a 17×17×17 color separation LUT.

Program instructions can also execute to convert resulting linearized black device values with replaced gray components to digital black device values. In one embodiment, program instructions can execute this conversion by using a linear to digital LUT, such as the one described in connection with FIG. 3.

Figure 5:
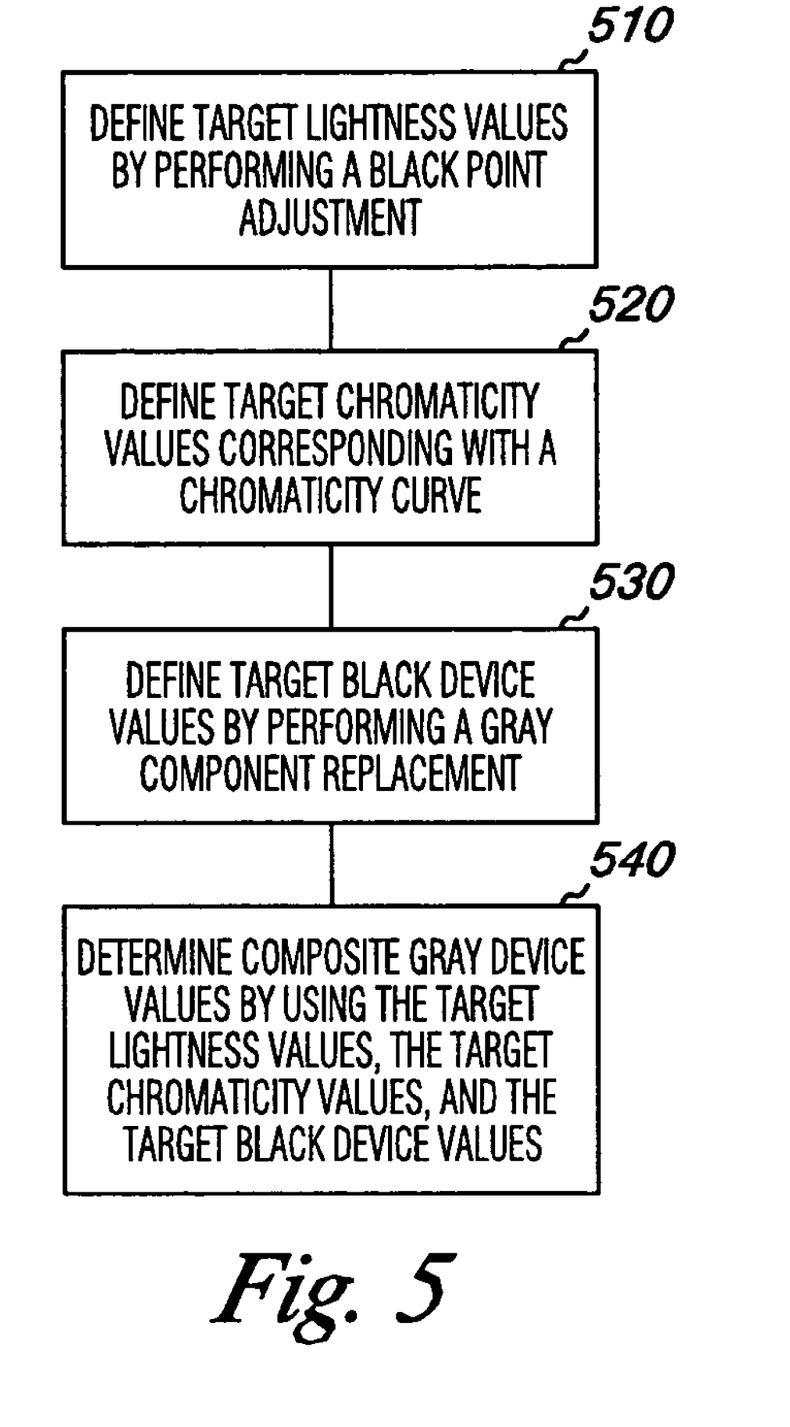
FIG. 5 is a flow chart illustrating a method for determining composite grays, according to embodiments of the present disclosure.
Figure 6:
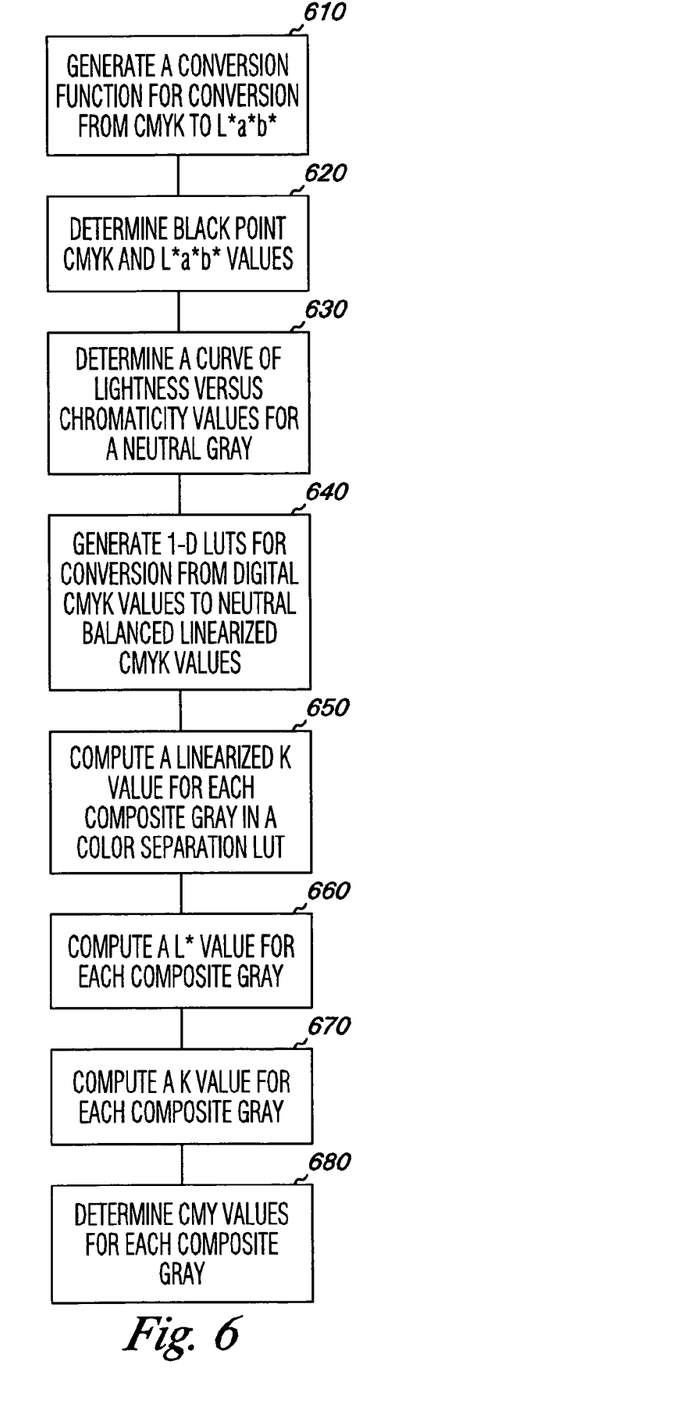
FIG. 6 is another flow chart illustrating a method for determining composite grays, according to embodiments of the present disclosure.

FIGS. 5 and 6 illustrate method embodiments according to the present disclosure. The method embodiments described herein can be performed by software and/or firmware (i.e., computer executable instructions), hardware, application modules, and the like, executable and/or resident on the systems and devices shown herein or otherwise. The embodiments of the present disclosure are not limited to any particular operating environment or to instructions written in a particular programming language. Software, firmware, and/or processing modules, suitable for carrying out embodiments of the present disclosure, can be resident in one or more devices or locations. Processing modules can include separate modules connected together or include several modules on an ASIC.

Unless explicitly stated, the method embodiments described herein are not constrained to a particular order or sequence. Additionally, some of the described method embodiments or elements thereof can occur, or be performed at, the same point in time.

FIG. 5 is a flow chart illustrating a method for determining composite grays, according to embodiments of the present disclosure. At block 510, target lightness values for composite grays can be defined by performing a black point adjustment. For example, program instructions can execute to define target lightness values in color exchange space by performing a black point adjustment on lightness values of digitized uniformly sampled black device values, as described in connection with FIGS. 3 and 4. Target chromaticity values for composite grays can be defined by using a chromaticity curve, according to block 520. In one embodiment, program instructions can execute to define target chromaticity values in color exchange space by using a chromaticity curve as a LUT, as described in FIG. 2. Target black device values for composite grays can be defined by performing a gray component replacement, at block 530. As one example, program instructions can execute to define target black device values by performing a gray component replacement on uniformly sampled linearized black device values and digitizing the values, as described in connection with FIGS. 3 and 4. According to the block 540, composite gray device values can be determined by using target lightness values, target chromaticity values, and target black device values. Program instructions can execute to determine composite gray device values by using the target lightness values of block 510, the target chromaticity values of block 520, and the target black device values of block 530. For example, program instructions can execute to use this method for a CMYK inkjet printer to define a target lightness L*, a target chromaticity a* and b*, and a target black device value K, to determine a composite gray CMYK.

Program instructions can also execute to determine composite gray device values at block 540 by color matching. Program instructions can perform this color matching by using a LUT that relates device values to color exchange space values, such as the LUT described in connection with FIG. 1. In this color matching, program instructions can execute to search through the LUT to determine non-black device values that correspond with the target black device values defined at block 530, in which the non-black device values match the target lightness values defined at block 510 and match the target chromaticity values defined at block 520. In searching for a match, program instructions need not find an exact match, but can find non-black device values in the LUT that approximate the target lightness and chromaticity values. In this embodiment, program instructions can execute to combine the non-black device values found in the LUT with the defined target black device values to determine composite grays. These determined composite grays may not require neutral recalibration. Additionally, this determination of composite grays can be performed as part of a color separation process.

As an example of determining composite grays for a CMYK inkjet printer according to the present disclosure, program instructions can execute to search through a CMYK2LAB LUT to find device values for C, M, and Y that correspond with target K device values, in which the found C, M, and Y match target L* values and target a* and b* values. Program instructions can execute to combine these found C, M, and Y device values with the target K values to determine CMYK values, which are composite grays. Program instructions can also execute to repeat to determine a set of N composite grays where N is a particular number that corresponds with a dimension of a color separation LUT.

FIG. 6 is another flow chart illustrating a method for determining composite grays, according to embodiments of the present disclosure. At block 610, a conversion function for conversion from CMYK device values to L*a*b* color exchange space values can be generated, as described in connection with FIG. 1. CMYK device values and L*a*b* values can be determined, as described with FIG. 1, for a black point, at block 620. A curve of lightness versus chromaticity values for a neutral gray can be determined, at block 630, as described for FIG. 2. At block 640, as described in connection with FIG. 3, a 1-D LUTs for conversion from digital CMYK values to neutral balanced linearized CMYK values can be generated. A linearized K value for each composite gray in a color separation LUT can be computed, at block 650, as described for FIG. 3. At block 660, as described for FIG. 4, a L* value can be computed for each composite gray. A K value for each composite gray can be computed at block 670, as described for FIG. 5. At block 680, CMY values for each composite gray can be determined, as described in connection with FIG. 5.

Although specific embodiments have been illustrated and described herein, those of ordinary skill in the art will appreciate that an arrangement calculated to implement the same techniques can be substituted for the specific embodiments shown. This disclosure is intended to cover all adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the programs and methods disclosed above are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer-readable medium having instructions stored thereon such that execution of the instructions by a processing device causes a method for determining composite grays to be performed, the method comprising:

defining target lightness values by performing a black point adjustment on lightness values of black device values, where performing the black point adjustment comprises evaluating:

$Lcrv = Lcbp + (Linp - Lpbp) * (Lwp - Lcbp) / (Lwp - Lpbp),$ where Lcrv is a target lightness value being defined, Lcbp is a lightness value of a composite gray black point for a device, Linp is an input lightness value for a black device point, Lpbp is a lightness value of a process black point for the device, and Lwp is a lightness value of a media white point;

defining target chromaticity values corresponding with a chromaticity curve of neutral grays;

defining target black device values by performing gray component replacement on black device values, where performing the gray component replacement comprises evaluating:

$Kgcr = Kmax * ((Kinp - Kstr) / (UPPER - Kstr))\hat{\ }EF,$ where Kgcr is a linearized black device value being defined and having a replaced gray component, Kmax is an upper black device value for the device, Kinp is an input linearized black device value having a gray component to be replaced, Kstr is a starting value for gray component replacement, UPPER is an upper device value for the device, and EF is an exponential shaping factor; and determining composite gray device values by using the target lightness values, the target chromaticity values, and the target black device values.

2. The computer-readable medium of claim 1, wherein defining the target lightness values includes defining target lightness values by performing the black point adjustment on the lightness values of black device values, wherein the black point adjustment is based on a black point, at which:
a black device value equals the upper device value for the device; and
each non-black device value equals a lower device value for the device.

3. The computer-readable medium of claim 2, wherein defining the target lightness values includes using a black point adjustment formula, which includes a white point, at which, a device value for each color of the output device, equals a lower device value for the device.

4. The computer-readable medium of claim 1, wherein defining the target chromaticity values includes defining target chromaticity values corresponding with a chromaticity curve, which includes:
a white point, with zero chromaticity; and
a black point, with a non-zero chromaticity.

5. The computer-readable medium of claim 1, wherein defining the target chromaticity values includes defining target chromaticity values, corresponding with a chromaticity curve, which includes a black point with a highest chromaticity of the chromaticity curve.

6. The computer-readable medium of claim 1, wherein defining the target chromaticity values includes defining target chromaticity values corresponding with a chromaticity curve, which smoothly transitions from a white point to a black point.

7. A computer readable medium, having instructions stored thereon for
causing a device to perform a method, comprising:
sampling black device values to obtain linearized black device values;
calculating lightness values of the linearized black device values, by evaluating:

$Lcrv = Lcbp + (Linp - Lpbp) * (Lwp - Lcbp) / (Lwp - Lpbp),$ where Lcrv is a target lightness value being calculated, Lcbp is a lightness value of a composite gray black point for a device, Linp is an input lightness value for a black device point, Lpbp is a lightness value of a process black point for the device, and Lwp is a lightness value of a media white point;

digitizing the linearized black device values to form digitized black device values;

determining black device values for composite gray device values by performing a gray component replacement on the digitized black device values, where performing the gray component replacement comprises evaluating:

$Kgcr = Kmax * (Kinp - Kstr) / (UPPER - Kstr))\hat{\ }EF,$ where Kgcr is a linearized black device value being determined and having a replaced gray component, Kmax is an upper black device value for the device, Kinp is an input linearized black device value having a gray component to be replaced, Kstr is a starting value for gray component replacement, UPPER is an upper device value for the device, and EF is an exponential shaping factor; and determining lightness values of the non-black device values of the composite gray device values by using the calculated lightness values.

8. The medium of claim 7, wherein the sampling includes sampling a digital-to-linear look-up-table for black device values.

9. The medium of claim 8, wherein the digitizing includes digitizing the linearized black device values by using a linear-to-digital look-up-table that is an inverse of the digital-to-linear look-up-table.

10. The medium of claim 7, wherein the sampling includes:
sampling a first black device value that is a lower device value of the device; and
sampling a second black device value that is an upper device value of the device.

11. The medium of claim 10, wherein the determining black device values includes using a gray component replacement formula, which includes the second black device value.

12. The medium of claim 10, wherein the sampling includes uniformly sampling black device values of the device, between the first black device value and the second black device value.

13. A printing device, comprising:
a processor;
a memory coupled to the processor; and
an ASIC, the ASIC including instructions executable to:
generate a conversion look-up-table that relates device values of a device to color exchange space values;
generate a digital-to-linear look-up-table for black device values of the device;
sample a black device value from the digital-to-linear look-up table and by employing gray component replacement, where performing the gray component replacement comprises evaluating:

$Kgcr = Kmax * ((Kinp - Kstr) / (UPPER - KstrY))\hat{\ }EF,$ where Kgcr is a linearized black device value being defined and having a replaced gray component, Kmax is an upper black device value for the device, Kinp is an input linearized black device value having a gray component to be replaced, Kstr is a starting value for gray component replacement, UPPER is an upper device value for the device, and EF is an exponential shaping factor; and determine at least a portion of a composite gray color for the output device by using the sampled black device value.

14. The printing device of claim 13, the ASIC including instructions executable to determine a black device color of the composite gray color by using the sampled black device value with a replaced gray component.

15. The printing device of claim 13, the ASIC including instructions executable to define a lightness of the composite gray color, by matching nonblack device colors in the look-up-table with a lightness value of the sampled black device value.

16. The printing device of claim 15, the ASIC including instructions executable to define a chromaticity of the composite gray color, by matching non-black device values in the look-up-table with a chromaticity value corresponding with a chromaticity curve.

17. The printing device of claim 16, the ASIC including instructions executable to repeat the program instructions to determine a set of N composite gray colors.

18. A device, comprising:
a processor;
a memory coupled to the processor; and
means for generating balanced composite grays suitable for mapping to a device gamut without adjusting a neutral balance of the grays, by performing color matching during a color separation process wherein the means for generating includes instructions executable to generate the balanced composite gray components by at least performing gray component replacement, where performing the gray component replacement comprises evaluating $$Kgcr = Kmax * ((Kinp - Kstr)/(UPPER - Kstr))^{EF},$$

where Kgcr is a linearized black device value being defined and having a replaced gray component, Kmax is an upper black device value for the device, Kinp is an input linearized black device value having a gray component to be replaced, Kstr is a starting value for gray component replacement, UPPER is an upper device value for the device, and EF is an exponential shaping factor.

19. The device of claim 18, wherein the means for generating includes instructions executable to generate the balanced composite grays by using a target produced by a device associated with the device gamut.

* * * * *